US011976500B2

(12) United States Patent
Kato et al.

(10) Patent No.: US 11,976,500 B2
(45) Date of Patent: May 7, 2024

(54) POWER-SUPPLY CONTROL SYSTEM AND POWER-SUPPLY CONTROL METHOD

(71) Applicant: HONDA MOTOR CO., LTD., Tokyo (JP)

(72) Inventors: Hisahiro Kato, Tokyo (JP); Toshibumi Shiohata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 219 days.

(21) Appl. No.: 17/579,126

(22) Filed: Jan. 19, 2022

(65) Prior Publication Data

US 2022/0268065 A1 Aug. 25, 2022

(30) Foreign Application Priority Data

Feb. 24, 2021 (JP) ................................ 2021-027036

(51) Int. Cl.
*E05B 81/64* (2014.01)
*E05B 81/56* (2014.01)
(Continued)

(52) U.S. Cl.
CPC .............. *E05B 81/64* (2013.01); *E05B 81/56* (2013.01); *E05B 81/80* (2013.01); *E05B 83/18* (2013.01); *E05F 15/60* (2015.01); *E05B 83/36* (2013.01); *E05Y 2201/434* (2013.01); *E05Y 2400/42* (2013.01); *E05Y 2400/452* (2013.01); *E05Y 2400/612* (2013.01); *E05Y 2400/616* (2013.01); *E05Y 2900/531* (2013.01); *E05Y 2900/548* (2013.01); *E05Y 2900/55* (2013.01)

(58) Field of Classification Search
CPC .......... E05B 81/56; E05B 81/64; E05B 81/80; E05B 83/16; E05B 83/18; E05B 83/36; E05F 15/60; E05Y 2201/434; E05Y 2400/42; E05Y 2400/452; E05Y 2400/61; E05Y 2400/612; E05Y 2400/616; E05Y 2900/531; E05Y 2900/532; E05Y 2900/546; E05Y 2900/548; E05Y 2900/55
See application file for complete search history.

(56) References Cited

U.S. PATENT DOCUMENTS 8,950,117 B2 * 2/2015 Djordjevic ................. B60J 5/06 49/324

FOREIGN PATENT DOCUMENTS

JP 2014080166 A * 5/2014 ........... B60R 16/023
WO 2019/160147 8/2019

* cited by examiner

*Primary Examiner* — Hung Q Nguyen
*Assistant Examiner* — Mark L. Greene
(74) *Attorney, Agent, or Firm* — Rankin, Hill & Clark LLP

(57) ABSTRACT

A power-supply control system includes: a lock control unit that controls a door-lock device; and a travel control unit that controls a travel operating unit related to either driving the power of the vehicle, braking the vehicle, or steering the vehicle. A lock high-level control unit, in a state in which supply of electric power to the lock control unit, the travel operating unit, and the travel control unit is stopped, while the first trigger signal is not outputted from an operation unit, makes electric power not be supplied from a power supply to the lock control unit, the travel operating unit, and the travel control unit, and when the first trigger signal is outputted, starts to supply electric power from the power supply to the lock control unit and the door-lock device and makes the lock control unit execute control to unlock the door-lock device.

9 Claims, 7 Drawing Sheets

(51) Int. Cl.

| | |
|---|---|
| ***E05B 81/80*** | (2014.01) |
| ***E05B 83/18*** | (2014.01) |
| ***E05F 15/60*** | (2015.01) |
| *E05B 83/36* | (2014.01) |

POWER-SUPPLY CONTROL SYSTEM AND POWER-SUPPLY CONTROL METHOD

INCORPORATION BY REFERENCE

The present application claims priority under 35 U.S.C. § 119 to Japanese Patent Application No. 2021-027036 filed on Feb. 24, 2021. The content of the application is incorporated herein by reference in its entirety.

BACKGROUND OF THE INVENTION

Field of the Invention

The present invention relates to power-supply control systems and power-supply control methods.

Description of the Related Art

A vehicle such as an automobile has a large number of electric devices nowadays, and thus it is desired that electric power be supplied to these electric devices efficiently. For example, International Publication No. WO2019/160147 discloses a technique in which to arrange wiring, the electric devices mounted on an automobile are classified into electric devices for high voltages, electric devices for a first function related to the travel of the automobile, and electric devices for a second function such as entertainment.

SUMMARY OF THE INVENTION

In general, the electric devices mounted in a vehicle start their operation at the same time at the startup of the vehicle or the like, and while the vehicle is operating, each electric device is always supplied with electric power. Hence, there is a problem that the more electric devices are mounted in a vehicle, the more electric power is consumed.

The present invention has been made in light of the background above, and an object thereof is to make it efficient to supply electric power to the electric devices mounted in the vehicle.

A first aspect to achieve the above object is a power-supply control system including: a lock control unit that controls a door-lock device configured to lock a door of a vehicle for getting in and out; a lock high-level control unit that turns on and off supply of electric power from a power supply of the vehicle to the lock control unit and makes the lock control unit control unlocking and locking of the door-lock device; a first open-close control unit that is connected to a first open-close unit configured to drive an open-close unit including one of the door for getting in and out, a door of a luggage compartment of the vehicle, and a window of the vehicle, and that controls the first open-close unit; a second open-close control unit that is connected to a second open-close unit configured to drive an open-close unit including one of the door for getting in and out, the door of the luggage compartment of the vehicle, and the window of the vehicle and that controls the second open-close unit; an open-close high-level control unit that is connected to an operation unit configured to detect operation by using a switch, and that based on the operation of the operation unit, executes at least one operation out of an operation of turning on and off supply of power from the power supply to the first open-close control unit, an operation of turning on and off supply of power from the power supply to the second open-close control unit, an operation of making the first open-close control unit execute control of open-close operation of the first open-close unit, and an operation of making the second open-close control unit execute control of open-close operation of the second open-close unit; and a travel control unit that controls a travel operating unit related to either driving the power of the vehicle, braking the vehicle, or steering the vehicle, in which the lock high-level control unit is connected to an operation detection unit that detects operation from the outside of the vehicle and outputs a first trigger signal, and the lock high-level control unit, in a state in which supply of electric power from the power supply to the lock control unit, the travel operating unit, and the travel control unit is stopped, while the first trigger signal is not outputted, makes electric power not be supplied from the power supply to the lock control unit, the travel operating unit, and the travel control unit, and when the first trigger signal is outputted, starts to supply electric power from the power supply to the lock control unit and the door-lock device and makes the lock control unit execute control to unlock the door-lock device.

The above power-supply control system may have a configuration in which when the switch detects operation, the open-close high-level control unit obtains a second trigger signal that the operation unit outputs, and the open-close high-level control unit, in a state in which supply of electric power from the power supply to the first open-close control unit, the second open-close control unit, the travel operating unit, and the travel control unit is stopped, while the second trigger signal is not outputted, makes electric power not be supplied from the power supply to the first open-close control unit, the second open-close control unit, the travel operating unit, and the travel control unit, and when the second trigger signal is outputted, starts to supply electric power from the power supply to the first open-close control unit, the second open-close control unit, and the open-close unit.

The above power-supply control system may have a configuration in which the power-supply control system further includes: a plurality of the travel control units that are control units different from the lock control unit, the first open-close control unit, and the second open-close control unit and control the travel operating unit; a plurality of non-travel control units that are control units different from the lock control unit, the first open-close control unit, and the second open-close control unit and controls a non-travel operating unit that is an operating unit different from driving the power of the vehicle, braking the vehicle, and steering the vehicle; an occupant detection unit that detects an occupant inside the vehicle and outputs a third trigger signal; and a non-travel high-level control unit that turns on and off supply of electric power from the power supply of the vehicle to the non-travel control units, and the non-travel high-level control unit, in a state in which supply of electric power from the power supply to the travel operating unit, the travel control units, and the non-travel control units is stopped, while the third trigger signal is not outputted, makes electric power not be supplied from the power supply to the travel operating unit, the travel control units, and the non-travel control units, and when the third trigger signal is outputted, starts to supply electric power from the power supply to the travel operating unit, the travel control units, and the non-travel control units.

The above power-supply control system may have a configuration in which the lock high-level control unit is disposed between the operation detection unit and the lock control unit, the open-close high-level control unit is disposed between the operation unit and the first and second open-close control units, the power-supply control system further includes a central control unit positioned between the operation detection unit and the lock high-level control unit and also positioned between the operation unit and the open-close high-level control unit, and the central control unit, in a state in which supply of electric power to the lock control unit, the first open-close control unit, the second open-close control unit, the travel operating unit, and the travel control units is stopped, while the first trigger signal and the second trigger signal are not outputted, makes electric power not be supplied from the power supply to the lock control unit, the first open-close control unit, the second open-close control unit, the travel operating unit, and the travel control units, and when the first trigger signal and the second trigger signal are outputted, starts to supply electric power from the power supply to the lock control unit, the first open-close control unit, the second open-close control unit, the travel operating unit, and the travel control units.

The above power-supply control system may have a configuration in which the power-supply control system further includes a travel high-level control unit that turns on and off supply of electric power from the power supply of the vehicle to the travel control units, and the central control unit has functions of at least two substitute-target control units, for which the central control unit substitutes, selected from the lock high-level control unit, the open-close high-level control unit, the non-travel high-level control unit, and the travel high-level control unit, and instead of the substitute-target control units, turns on and off supply of electric power from the power supply based on the first trigger signal, the second trigger signal, and the third trigger signal.

The above power-supply control system may have a configuration in which the power-supply control system further includes a travel detection unit that outputs a fourth trigger signal that indicates a traveling state of the vehicle, and the central control unit, in a case in which it is determined based on the fourth trigger signal that the vehicle is traveling, makes electric power not be supplied from the power supply to at least one of the first open-close control unit, the second open-close control unit, the first open-close unit, and the second open-close unit.

The above power-supply control system may have a configuration in which the power-supply control system further includes an impact detection unit that detects an impact exerted on the vehicle, and the central control unit, when the impact detection unit detects an impact, makes electric power be supplied from the power supply to at least one of the first open-close control unit, the second open-close control unit, the first open-close unit, and the second open-close unit.

The above power-supply control system may have a configuration in which in response to operation of a second operation unit that detects operation by using a second switch, the central control unit makes power not be supplied from the power supply to the operation detection unit, and power is made not to be supplied from the power supply to at least one of the central control unit, the lock high-level control unit, the open-close high-level control unit, and the non-travel high-level control unit.

The above power-supply control system may have a configuration in which the power-supply control system further includes one ECU that executes functions of the lock high-level control unit and the open-close high-level control unit.

The above power-supply control system may have a configuration in which the central control unit, while a self-starting motor provided for an internal combustion engine included in the vehicle is operating, stops supplying electric power from the power supply to at least one of the non-travel control units and the non-travel operating unit, and supplies electric power from the power supply to the travel control units and the travel operating unit.

A second aspect to achieve the above object is a power-supply control method in a power-supply control system including: a lock control unit that controls a door-lock device configured to lock a door of a vehicle for getting in and out; a lock high-level control unit that turns on and off supply of electric power from a power supply of the vehicle to the lock control unit and makes the lock control unit control unlocking and locking of the door-lock device; a first open-close control unit that is connected to a first open-close unit configured to drive an open-close unit including one of the door for getting in and out, a door of a luggage compartment of the vehicle, and a window of the vehicle, and that controls the first open-close unit; a second open-close control unit that is connected to a second open-close unit configured to drive an open-close unit including one of the door for getting in and out, the door of the luggage compartment of the vehicle, and the window of the vehicle and that controls the second open-close unit; an open-close high-level control unit that is connected to an operation unit configured to detect operation by using a switch, and that based the operation of the operation unit, executes at least one operation out of an operation of turning on and off supply of power from the power supply to the first open-close control unit, an operation of turning on and off supply of power from the power supply to the second open-close control unit, an operation of making the first open-close control unit execute control of open-close operation of the first open-close unit, and an operation of making the second open-close control unit execute control of open-close operation of the second open-close unit; and a travel control unit that controls a travel operating unit related to either driving the power of the vehicle, braking the vehicle, or steering the vehicle, the power-supply control method including: obtaining, by an operation detection unit, a first trigger signal outputted in response to operation from the outside of the vehicle; and in a state in which supply of electric power from the power supply to the lock control unit, the travel operating unit, and the travel control unit is stopped, while the first trigger signal is not outputted, making electric power not be supplied from the power supply to the lock control unit, the travel operating unit, and the travel control unit, and when the first trigger signal is outputted, starting supply electric power from the power supply to the lock control unit and the door-lock device and making the lock control unit execute control to unlock the door-lock device.

The above configurations make it possible to supply electric power efficiently by switching supply of electric power to the operating units and the control units in the vehicle according to the necessity of control.

DETAILED DESCRIPTION OF THE PREFERRED EMBODIMENTS

1. Configuration of Vehicle Control System

Figure 1:
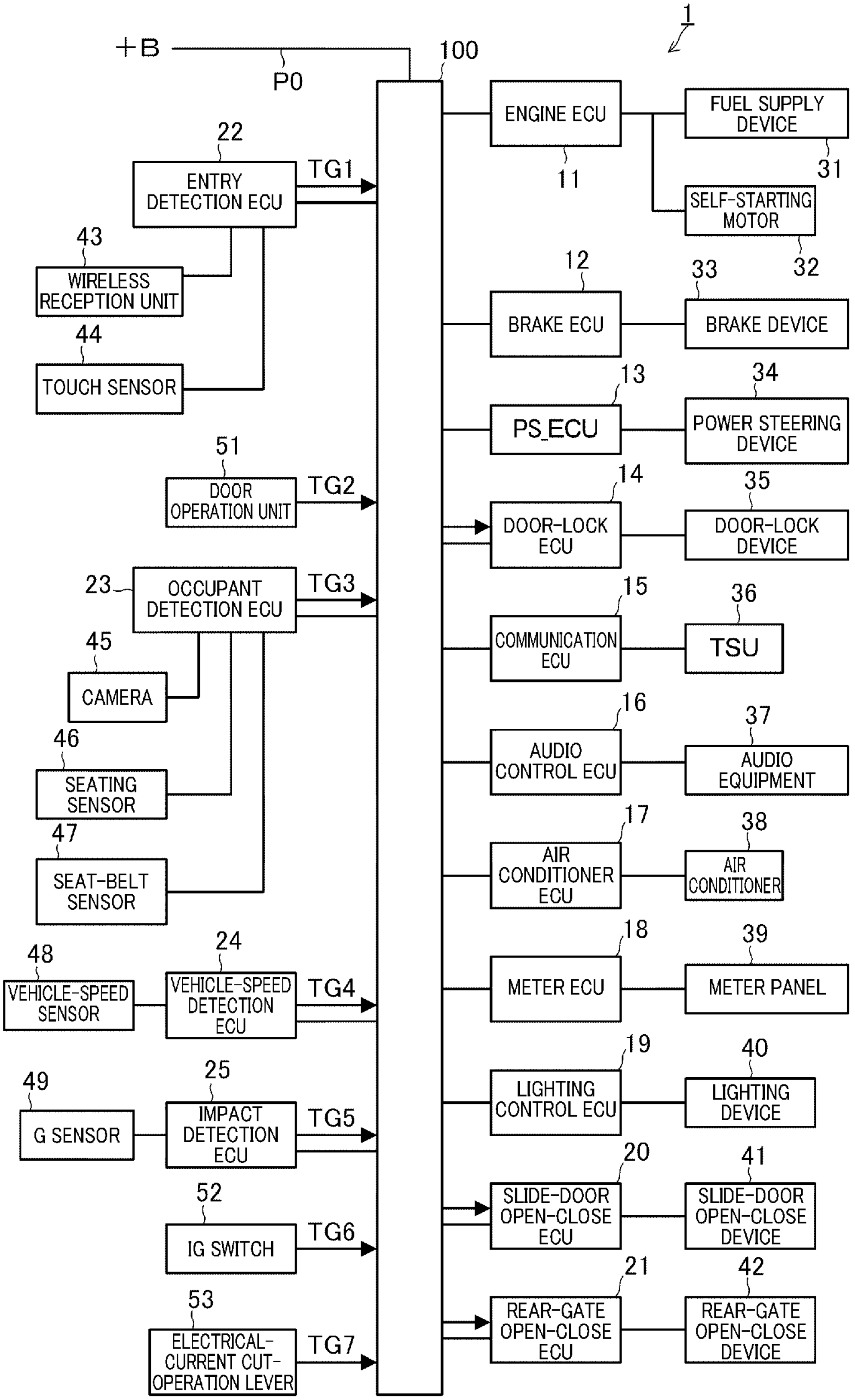
FIG. 1 is a schematic configuration diagram of a power-supply control system.

FIG. 1 is a schematic configuration diagram of a vehicle control system 1 according to an embodiment of the present invention. The vehicle control system 1 corresponds to an example of a power-supply control system.

The vehicle control system 1 is provided in a vehicle and controls various operations including the traveling of the vehicle. The present embodiment shows a four-wheeled automobile as an example of a vehicle. This vehicle has a plurality of doors through which persons get in and out, and some of the doors are slide doors. The vehicle described in the present embodiment has a passenger compartment in which persons get in and a space for loading baggage, and has a rear gate through which the space is accessible. The passenger compartment has seats on which the persons who got in sit. In the following, the persons who got in the vehicle are called the occupants. The occupants include the driver and the persons other than the driver.

The following describes a configuration in which the vehicle includes ECUs that control various functional units. The ECU (electronic control unit) includes a processor that has a function that controls motors, actuators, sensors, and the like, and is a circuit including semiconductor devices and other peripheral devices. Although the following describes a plurality of ECUs classified according to the functions in the vehicle and devices controlled by the ECUs, this configuration is a mere example. For example, the plurality of ECUs described in the following can actually be composed of one semiconductor device, or conversely, one ECU described in the following can be composed of a plurality of semiconductor devices. In addition, the vehicle may include functional units and ECUs not illustrated in FIG. 1.

FIG. 1 shows a fuel supply device 31, a self-starting motor 32, a brake device 33, and a power steering device 34 as travel operating units related to either driving the power of the vehicle, braking the vehicle, or steering the vehicle.

FIG. 1 also shows audio equipment 37, an air conditioner 38, and a meter panel 39 as non-travel operating units which are operating units of the vehicle different from the travel operating units.

FIG. 1 also shows a telematics service unit (TSU) 36 (transmitter/receiver, circuit) and lighting devices 40 (lamp, light emitting element) as general operating units which operate regardless of the traveling state of the vehicle. The general operations unit may be included in the non-travel devices.

FIG. 1 also shows door-lock devices 35 that lock the doors for getting in and out and the rear gate, a slide-door open-close device 41 (mechanism, actuator) that opens and closes the slide door, and a rear-gate open-close device 42 (mechanism, actuator) that opens and closes the rear gate. The slide-door open-close device 41 and the rear-gate open-close device 42 correspond to examples of a first open-close unit and a second open-close unit, respectively.

The vehicle control system 1 includes an engine ECU 11, a brake ECU 12, and a power-steering (PS) ECU 13 as travel control units that control operations related to the traveling of the vehicle. The engine ECU 11 performs control necessary for the operation of the internal combustion engine (engine). Specifically, the engine ECU 11 supplies electric power to the fuel supply device 31 and the self-starting motor 32 and controls the operations of those. The brake ECU 12 supplies electric power to the brake device 33 and controls the operation of the brake device 33. The power steering ECU 13 supplies electric power to the power steering device 34 and controls the operation of the power steering device 34. The engine ECU 11, the brake ECU 12, and the power steering ECU 13 correspond to examples of travel control units. The fuel supply device 31, the self-starting motor 32, the brake device 33, and the power steering device 34 correspond to examples of travel operating units.

The vehicle control system 1 includes a door-lock ECU 14, a communication ECU 15, an audio control ECU 16, an air conditioner ECU 17, a meter ECU 18, a lighting control ECU 19, a slide-door open-close ECU 20, and a rear-gate open-close ECU 21.

A power-supply control device 100 supplies electric power to the control units of the vehicle based on the electric power supplied from a power supply line P0 of the vehicle. The units that the power-supply control device 100 supplies electric power to include the engine ECU 11, the brake ECU 12, the power steering ECU 13, the door-lock ECU 14, the communication ECU 15, the audio control ECU 16, the air conditioner ECU 17, the meter ECU 18, the lighting control ECU 19, the slide-door open-close ECU 20, and the rear-gate open-close ECU 21. The power-supply control device 100 supplies electric power to an entry detection ECU 22, an occupant detection ECU 23, a vehicle-speed detection ECU 24, and an impact detection ECU 25, which are described later, based on the electric power supplied through the power supply line P0.

The power supply line P0 is connected to a power supply +B of the vehicle. The power supply +B is what is called the power supply of the vehicle, and is connected to a battery mounted on the vehicle and a generator driven by the engine of the vehicle. In the case in which the vehicle includes a driving motor, and the motor performs regenerative operation, the electric power generated by the regeneration may be supplied to the power supply +B.

The door-lock ECU 14 controls a door-lock device 35 to make it lock and unlock the doors. The door-lock ECU 14 turns on and off the power supply to the door-lock device 35. The door-lock ECU 14 corresponds to an example of a lock control unit. The communication ECU 15 is connected to the TSU 36. The communication ECU 15 controls the TSU 36 to make it execute data communication through a mobile communication line. The communication ECU 15 turns on and off the power supply to the TSU 36. The audio control ECU 16 turns on and off the power supply to the audio equipment 37 and controls the audio equipment 37. The air conditioner ECU 17 turns on and off the power supply to the air conditioner 38 and controls the air conditioner 38. The meter ECU 18 turns on and off the power supply to the meter panel 39 and controls the meter panel 39. The lighting control ECU 19 turns on and off the power supply to the lighting devices 40 provided inside and outside the passenger compartment of the vehicle and controls the lighting states of the lighting devices 40. The slide-door open-close ECU 20 turns on and off the power supply to the slide-door open-close device 41. The slide-door open-close ECU 20 controls the slide-door open-close device 41 to make it execute open-close operation of the slide door. The rear-gate open-close ECU 21 turns on and off the power supply to the rear-gate open-close device 42. The rear-gate open-close ECU 21 controls the rear-gate open-close device 42 to make it execute open-close operation of the rear gate.

The door-lock ECU 14 corresponds to an example of a lock control unit, and the audio control ECU 16, the air conditioner ECU 17, and the meter ECU 18 correspond to examples of non-travel control units. The slide-door open-close ECU 20 corresponds to an example of a first open-close control unit, the rear-gate open-close ECU 21 corresponds to an example of a second open-close control unit, the slide-door open-close device 41 corresponds to an example of a first open-close unit, and the rear-gate open-close device 42 corresponds to an example of a second open-close unit.

The power-supply control device 100 outputs a control signal to the door-lock ECU 14 to make it instruct the door-lock device 35 to perform unlocking. The power-supply control device 100 outputs a control signal to the slide-door open-close ECU 20 to make it instruct the slide-door open-close device 41 to open the slide door. The power-supply control device 100 outputs a control signal to the rear-gate open-close ECU 21 to make it instruct the rear-gate open-close device 42 to open the rear gate.

The communication ECU 15 and the lighting control ECU 19 correspond to general-operation control units.

The audio control ECU 16, the air conditioner ECU 17, and the meter ECU 18 correspond to examples of non-travel control units.

The slide-door open-close ECU 20 corresponds to an example of a first open-close control unit, and the rear-gate open-close ECU 21 corresponds to an example of a second open-close control unit.

FIG. 1 shows a wireless reception unit 43 (receiver, circuit), touch sensors 44, a camera 45, seating sensors 46, seat-belt sensors 47, a vehicle-speed sensor 48, and a G sensor 49 as detection units included in the vehicle. The wireless reception unit 43 receives wireless signals transmitted by a frequency operated button (FOB) key. The touch sensor 44 is provided to the door handle of the vehicle and detects touch operation performed by a person who intends to get in the vehicle. The camera 45 is a digital camera that captures images of the inside of the passenger compartment. The seating sensor 46 is a sensor that detects whether a person is sitting on a seat of the vehicle and includes, for example, a pressure sensor embedded in the seat. The seat-belt sensor 47 is a sensor of a switch type, for example, built in the buckle of the seat belt and detects whether the seat belt is buckled. The seating sensor 46 and the seat-belt sensor 47 are provided to each seat included in the vehicle.

The vehicle control system 1 includes the entry detection ECU 22, the occupant detection ECU 23, the vehicle-speed detection ECU 24, and the impact detection ECU 25 as control units that control the detection units.

The entry detection ECU 22 is connected to the wireless reception unit 43 and the touch sensors 44. The entry detection ECU 22 detects an operation of a person intending to get in the vehicle, in other words, an entry operation based on the outputs of the wireless reception unit 43 and the touch sensors 44. When the entry detection ECU 22 detects an entry operation, it outputs a trigger signal TG1. The occupant detection ECU 23 is connected to the camera 45, the seating sensors 46, and the seat-belt sensors 47. The occupant detection ECU 23 detects whether a person is in the vehicle based on at least one of an image captured by the camera 45, the detection states of the seating sensors 46, and the detection states of the seat-belt sensors 47. When the occupant detection ECU 23 detects that a person is in the vehicle, it outputs a trigger signal TG3. The vehicle-speed detection ECU 24 is connected to the vehicle-speed sensor 48 and detects the traveling speed of the vehicle. When the traveling speed of the vehicle is not zero, in other words, when the vehicle is not stopped, the vehicle-speed detection ECU 24 outputs a trigger signal TG4. The impact detection ECU 25 is connected to the G sensor 49, and when the G sensor 49 detects an acceleration exceeding a preset threshold, it outputs a trigger signal TG5 indicating that an impact is exerted on the vehicle. An acceleration exceeding the preset threshold indicates, for example, that an object collided with the vehicle. The entry detection ECU 22 corresponds to an example of an operation detection unit. The occupant detection ECU 23 corresponds to an example of an occupant detection unit, the vehicle-speed detection ECU 24 corresponds to an example of a vehicle-speed detection unit, and the impact detection ECU 25 corresponds to an example of an impact detection unit.

Door operation units 51, an ignition (IG) switch 52, and an electrical-current cut-operation lever 53 are connected to the power-supply control device 100. The door operation unit 51 is an operation unit that a person operates to open the door for getting in and out of the vehicle; for example, the door operation unit 51 is a lever or a handle. The door operation unit 51 includes a sensor of a switch type that turns on by the operation of the lever or handle. When the switch turns on, the door operation unit 51 outputs a trigger signal TG2. The ignition switch 52 is a switch that gives an instruction to start up the vehicle. The startup of the vehicle means starting the engine of the vehicle, starting the power supply to each unit of the vehicle, and other operations. Since the vehicle of the present embodiment has an engine, the ignition switch 52 is a switch that gives an instruction to start the engine. The ignition switch 52 outputs a trigger signal TG6 in response to the operation. The electrical-current cut-operation lever 53 is a lever that gives an instruction to cut off the power supply of the vehicle and includes a switch that turns on in response to the operation of the lever. The electrical-current cut-operation lever 53 outputs a trigger signal TG7 in response to the operation of the lever. The vehicle control system 1 stops the power supply to the entry detection ECU 22, the wireless reception unit 43, and the touch sensors 44 in response to the operation of the electrical-current cut-operation lever 53. In this case, the entry detection ECU 22 cannot detect the FOB key and operation of the door handles. The electrical-current cut-operation lever 53 is operated, for example, when the vehicle is transported, mounted on a freight vehicle or a ship. The operation of the electrical-current cut-operation lever 53 can reduce the dark current that flows in the vehicle during transportation. The door operation unit 51 corresponds to an example of an operation unit, and the electrical-current cut-operation lever 53 corresponds to an example of a second operation unit.

The trigger signals TG1, TG2, TG3, TG4, TG5, TG6, and TG7 are inputted to the power-supply control device 100. The trigger signal TG1 corresponds to a first trigger signal, the trigger signal TG2 a second trigger signal, the trigger signal TG3 a third trigger signal, and the trigger signal TG4 a fourth trigger signal.

2. Configuration of Power-Supply Control Device

Figure 2:
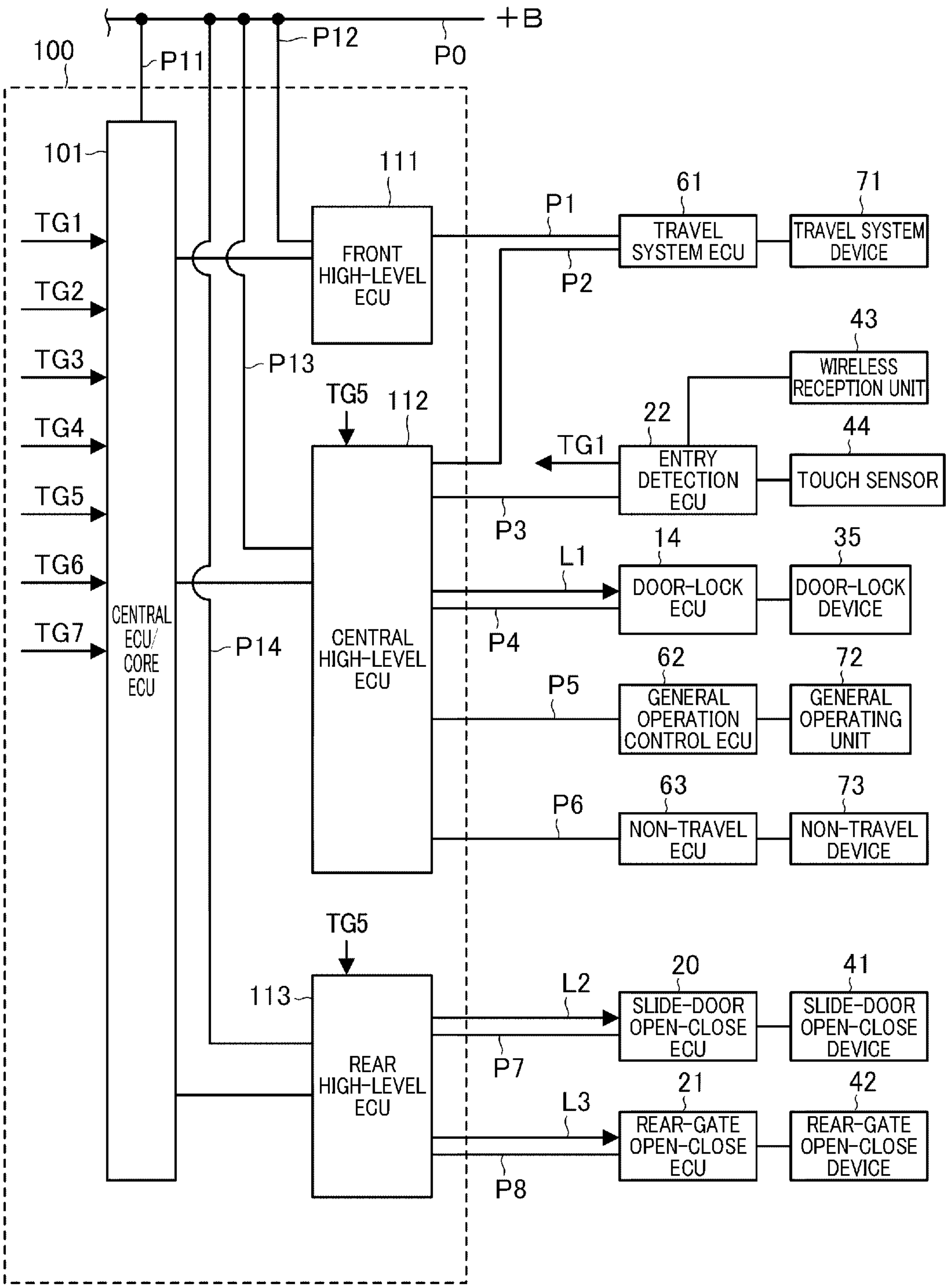
FIG. 2 is a configuration diagram of a power-supply control device.

FIG. 2 is a configuration diagram of the power-supply control device 100. For explanation, FIG. 2 illustrates the configuration of the vehicle, connected to the power-supply control device 100.

A travel system ECU 61, out of the control units connected to the power-supply control device 100, is illustrated as one block representing, for example, all of the engine ECU 11, the brake ECU 12, and the power steering ECU 13 illustrated in FIG. 1. A travel system device 71 is illustrated as one block representing all of the fuel supply device 31, the self-starting motor 32, the brake device 33, and the power steering device 34. Similarly, a general operation control ECU 62 includes the communication ECU 15 and the lighting control ECU 19, and a general operating unit 72 includes the TSU 36 and the lighting devices 40. A non-travel ECU 63 includes the audio control ECU 16, the air conditioner ECU 17, and the meter ECU 18, and a non-travel device 73 includes the audio equipment 37, the air conditioner 38, and the meter panel 39. The travel system ECU 61 corresponds to an example of a travel control unit, and the travel system device 71 corresponds to an example of a travel operating unit. The non-travel ECU 63 corresponds to an example of a non-travel control unit, and the non-travel device 73 corresponds to an example of a non-travel operating unit.

The power-supply control device 100 includes a central ECU/core ECU 101, a front high-level ECU 111, a central high-level ECU 112, and a rear high-level ECU 113. The central ECU/core ECU 101 is connected to the power supply line P0 through a power supply line P11. The front high-level ECU 111 is connected to the power supply line P0 through a power supply line P12. The central high-level ECU 112 and the rear high-level ECU 113 are similarly connected to the power supply line P0 through power supply lines P13 and P14, respectively. The central ECU/core ECU 101 corresponds to an example of a central control unit, and the front high-level ECU 111 corresponds to an example of a travel high-level control unit. The central high-level ECU 112 corresponds to examples of a lock high-level control unit, a non-travel high-level control unit, and a travel high-level control unit, and the rear high-level ECU 113 corresponds to an example of an open-close high-level control unit.

The front high-level ECU 111, the central high-level ECU 112, and the rear high-level ECU 113 are each connected to a plurality of ECUs mounted on the vehicle and operate as an ECU ranked higher than these ECU. In the present embodiment, the front high-level ECU 111 is connected to the travel system ECU 61, and the central high-level ECU 112 is connected to the door-lock ECU 14, the entry detection ECU 22, the travel system ECU 61, the general operation control ECU 62, and the non-travel ECU 63. The rear high-level ECU 113 is connected to the slide-door open-close ECU 20 and the rear-gate open-close ECU 21.

The present embodiment illustrates, as examples of high-level ECUs, the front high-level ECU 111 which controls the ECUs disposed at front portions of the vehicle, the central high-level ECU 112 which controls the ECUs disposed at center portions of the vehicle, and the rear high-level ECU 113 which controls the ECUs disposed at rear portions of the vehicle. Since the ECUs illustrated in FIG. 1 are disposed at various portions of the vehicle, it is reasonable to connect the ECUs to the high-level ECUs based on the positions of the ECUs in the vehicle. This is a mere example, and thus, for example, the ECUs mounted on the vehicle may be classified according to the types or the functions of the ECUs and may be connected to the high-level ECUs according to the classification.

The high-level ECU turns on and off the power supply to the low-level ECUs and outputs control signals to the low-level ECUs.

For example, the front high-level ECU 111 supplies electric power to the travel system ECU 61 through a power supply line P1. In other words, the front high-level ECU 111 is disposed between the power supply line P1 to the travel system ECU 61 and the power supply line P12 and connects and disconnects the power supply from the power supply line P12 to the power supply line P1. When the front high-level ECU 111 supplies electric power to the travel system ECU 61, the travel system ECU 61 and the travel system device 71 are put in operable states.

The central high-level ECU 112 supplies electric power to the door-lock ECU 14, the entry detection ECU 22, the general operation control ECU 62, and the non-travel ECU 63. With this operation, these ECUs, the door-lock device 35, the wireless reception unit 43, the touch sensors 44, the general operating unit 72, and the non-travel device 73 are put in operable states. The central high-level ECU 112 outputs a control signal through a signal line L1 to the door-lock ECU 14 to give an instruction for unlocking.

The rear high-level ECU 113 supplies electric power to the slide-door open-close ECU 20 and the rear-gate open-close ECU 21 through power supply lines P7 and P8, respectively. This makes the slide-door open-close ECU 20, the rear-gate open-close ECU 21, the slide-door open-close device 41, and the rear-gate open-close device 42 in operable states. The rear high-level ECU 113 outputs a control signal through a signal line L2 to the slide-door open-close ECU 20 to instruct it to open the slide door. The rear high-level ECU 113 outputs a control signal through a signal line L3 to the rear-gate open-close ECU 21 to instruct it to open the rear gate.

The front high-level ECU 111, the central high-level ECU 112, and the rear high-level ECU 113 are connected to the central ECU/core ECU 101. The central ECU/core ECU 101 controls the front high-level ECU 111, the central high-level ECU 112, and the rear high-level ECU 113 in response to input of the trigger signals TG1 to TG7.

In the configurations illustrated in FIGS. 1 and 2, the ECUs connected to the front high-level ECU 111, the central high-level ECU 112, and the rear high-level ECU 113 have functions of transmitting and receiving various kinds of data through not-illustrated signal lines. These signal lines are, for example, the Controller Area Network (CAN) bus. The signal lines L1, L2, and L3 illustrated in FIG. 2 may be signal lines different from the CAN bus or may be ones utilizing the CAN bus.

Figure 3:
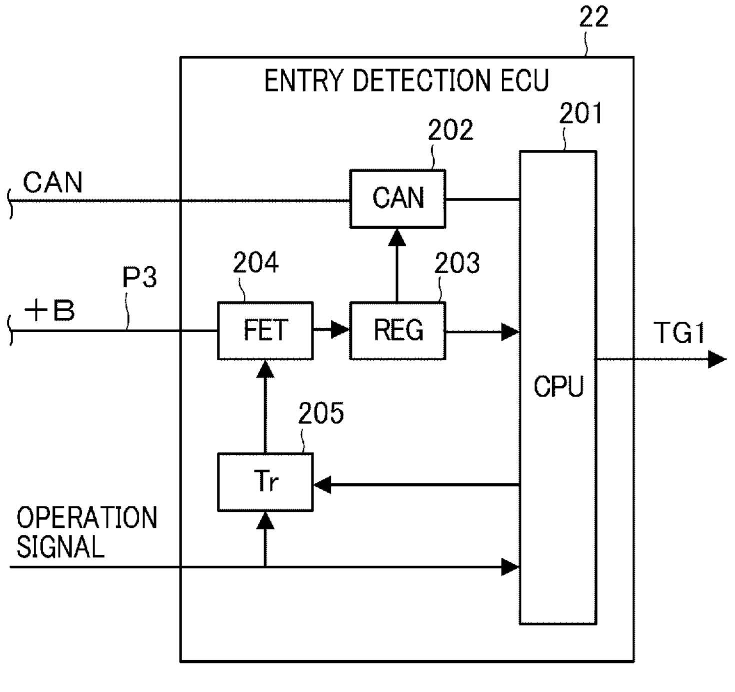
FIG. 3 is a diagram illustrating a configuration example of an ECU.
Figure 4:
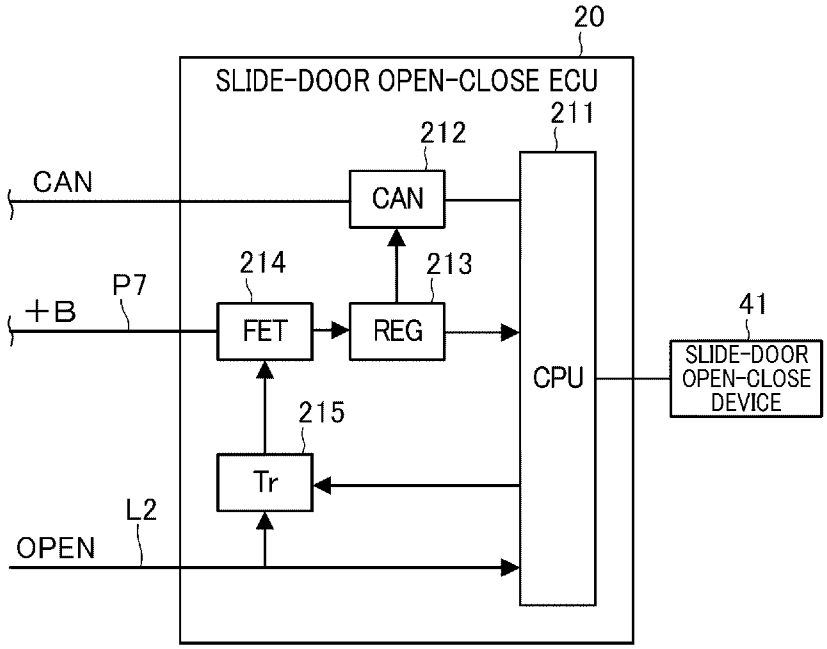
FIG. 4 is a diagram illustrating a configuration example of an ECU.
Figure 5:
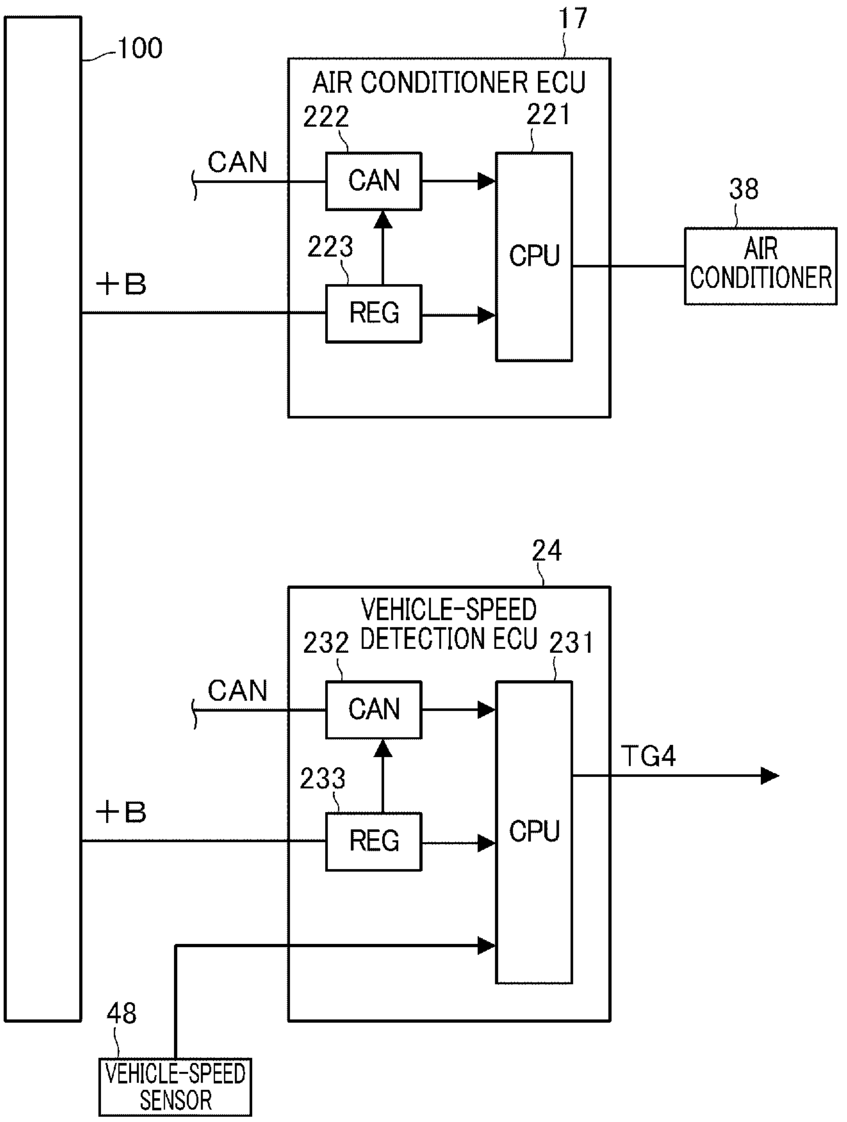
FIG. 5 is a diagram illustrating configuration examples of ECUs.

FIGS. 3, 4, and 5 are diagrams illustrating configuration examples of ECUs connected to the power-supply control device 100.

FIG. 3 illustrates the configuration of the entry detection ECU 22. The entry detection ECU 22 includes a CPU 201, a CAN communication unit 202, a regulator 203, and switching devices 204 and 205. The CPU (central processing unit) 201 is a processor that implements the processing functions of the entry detection ECU 22 and may be called a micro controller.

The CAN communication unit 202 is a communication circuit connected to the CAN bus. The CAN communication unit 202 executes data communication through the CAN bus according to the control of the CPU 201.

The regulator 203 converts the voltage of the electric power supplied from a power supply line P3 and supplies electric power to the CPU 201. The switching device 204 is disposed between the power supply line P3 and the regulator 203. The switching device 204 includes, for example, a field effect transistor (FET) and turns on and off the supply of electric power from the power supply line P3 to the regulator

203 according to the voltage inputted from the switching device 205. The switching device 205 is connected to the line through which operation signals are inputted from the wireless reception unit 43 and the touch sensors 44 to the CPU 201. When the wireless reception unit 43 or a touch sensor 44 outputs an operation signal, the switching device 205 turns on and outputs a voltage to the switching device 204, which turns on the switching device 204.

In the entry detection ECU 22, as described above, after the supply of power from the power supply line P3 starts, when an operation signal is inputted from the wireless reception unit 43 or a touch sensor 44, the supply of electric power from the regulator 203 to the CPU 201 and the CAN communication unit 202 starts. When the supply of electric power from the regulator 203 to the CPU 201 starts, the CPU 201 starts its operation. The CPU 201 outputs a trigger signal TG1 in response to the operation of the wireless reception unit 43 or the touch sensor 44. The CPU 201, after starting its operation, latches the output to the switching device 204 by self-latching. With this operation, while electric power is supplied from the power supply line P3, the CPU 201 and the CAN communication unit 202 can continue operating. When the central high-level ECU 112 cuts off the supply of electric power to the power supply line P3, the entry detection ECU 22 stops its operation.

FIG. 4 is a diagram illustrating the configuration of the slide-door open-close ECU 20. The rear-gate open-close ECU 21 has a configuration the same as or similar to that of the slide-door open-close ECU 20 illustrated in FIG. 4.

The slide-door open-close ECU 20 includes a CPU 211, a CAN communication unit 212, a regulator 213, and switching devices 214 and 215. The CPU 211 is a processor that implement the processing functions of the slide-door open-close ECU 20.

The CAN communication unit 212 is a communication circuit connected to the CAN bus. The CAN communication unit 212 executes data communication through the CAN bus according to the control of the CPU 211.

The regulator 213 converts the voltage of the electric power supplied from the power supply line P7 and supplies electric power to the CPU 211. The switching device 214 is disposed between the power supply line P7 and the regulator 213. The switching device 214 includes, for example, an FET and turns on and off the supply of electric power from the power supply line P7 to the regulator 213 according to the voltage inputted from the switching device 215. The switching device 215 is connected to the signal line L2. When there is an input from the rear high-level ECU 113 through the signal line L2, the switching device 215 turns on and outputs a voltage to the switching device 214, which turns on the switching device 214.

In the slide-door open-close ECU 20, after the supply of power from the power supply line P7 starts, when a signal is inputted through the signal line L2, the regulator 213 starts to supply electric power to the CPU 211 and the CAN communication unit 212. When the regulator 213 starts to supply electric power to the CPU 211, the CPU 211 starts its operation. The CPU 211, in response to the signal through the signal line L2, operates the slide-door open-close device 41 to make it execute operation to open the slide door. The CPU 211, after starting its operation, latches the output to the switching device 214 by self-latching. With this operation, while electric power is supplied from the power supply line P7, the CPU 211 and the CAN communication unit 212 can continue operating. When the rear high-level ECU 113 cuts off the supply of electric power to the power supply line P7, the slide-door open-close ECU 20 stops its operation.

FIG. 5 is a diagram illustrating the configurations of the air conditioner ECU 17 and the vehicle-speed detection ECU 24. The configurations illustrated in FIG. 5 are mere examples. For example, the engine ECU 11, the brake ECU 12, the power steering ECU 13, the communication ECU 15, the audio control ECU 16, the meter ECU 18, and the lighting control ECU 19 may have configurations the same as or similar to that of the air conditioner ECU 17 illustrated in FIG. 5. The impact detection ECU 25 may have a configuration the same as or similar to that of the vehicle-speed detection ECU 24 illustrated in FIG. 5.

The air conditioner ECU 17 includes a CPU 221, a CAN communication unit 222, and a regulator 223. The CPU 221 is a processor that implements the processing functions of the air conditioner ECU 17.

The CAN communication unit 222 is a communication circuit connected to the CAN bus. The CAN communication unit 222 executes data communication through the CAN bus according to the control of the CPU 221.

The regulator 223 converts the voltage of the electric power supplied from the power-supply control device 100 and supplies electric power to the CPU 221. When the supply of power from the power-supply control device 100 to the CPU 221 starts, the CPU 221 is activated and starts its operation. The CPU 221, based on data received via the CAN bus, operates the air conditioner 38 which is a control target. When the power-supply control device 100 cuts off the supply of electric power to the air conditioner ECU 17, each part of the air conditioner ECU 17 including the CPU 221 stops its operation.

The vehicle-speed detection ECU 24 includes a CPU 231, a CAN communication unit 232, and a regulator 233. The CPU 231 is a processor that implements the processing functions of the vehicle-speed detection ECU 24. The vehicle-speed detection ECU 24 receives signal input from the vehicle-speed sensor 48.

The CAN communication unit 232 is a communication circuit connected to the CAN bus. The CAN communication unit 232 executes data communication through the CAN bus according to the control of the CPU 231.

The regulator 233 converts the voltage of the electric power supplied from the power-supply control device 100 and supplies electric power to the CPU 231. When the supply of power from the power-supply control device 100 to the CPU 231 starts, the CPU 231 is activated and starts its operation. The CPU 231 determines whether the vehicle is stopped or traveling based on the signals inputted from the vehicle-speed sensor 48. When the vehicle is traveling, the CPU 231 outputs the trigger signal TG4. When the power-supply control device 100 cuts off the supply of electric power to the vehicle-speed detection ECU 24, each part of the vehicle-speed detection ECU 24 including the CPU 231 stops its operation.

Figure 6:
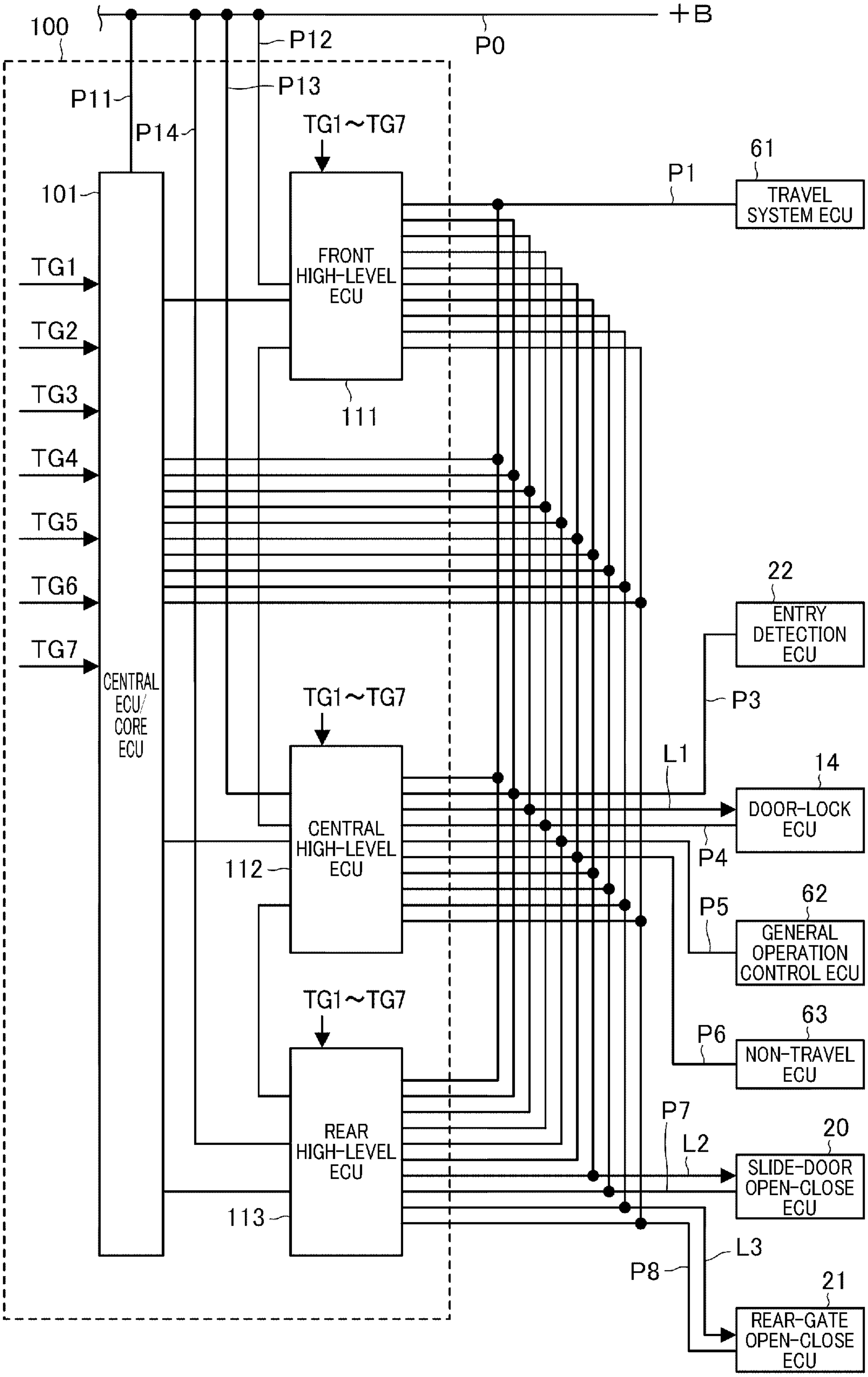
FIG. 6 is an explanatory diagram illustrating the redundancy configuration of the power-supply control system.

FIG. 6 is an explanatory diagram illustrating the redundancy configuration of the power-supply control device 100.

The high-level ECUs included in the power-supply control device 100 are configured such that, in the case in which a failure occurs in one of the high-level ECUs, another high-level ECU can execute the functions of the failed high-level ECU as the substitute. An example of this configuration is illustrated in FIG. 6.

In the configuration illustrated in FIG. 6, the power supply line P1 that supplies electric power from the power-supply control device 100 to the travel system ECU 61 is connected to the front high-level ECU 111, the central high-level ECU 112, the rear high-level ECU 113, and the central ECU/core ECU 101.

Similarly, the power supply lines P3, P5, P6, P7, and P8 are connected to the front high-level ECU 111, the central high-level ECU 112, the rear high-level ECU 113, and the central ECU/core ECU 101. The signal lines L1, L2, and L3 are also connected to the front high-level ECU 111, the central high-level ECU 112, the rear high-level ECU 113, and the central ECU/core ECU 101.

The front high-level ECU 111, the central high-level ECU 112, and the rear high-level ECU 113 receive input of the trigger signals TG1 to TG7.

In the case in which a failure occurs in the central ECU/core ECU 101, the central ECU/core ECU 101 detects the failure by its self-diagnosis function, selects at least one of the front high-level ECU 111, the central high-level ECU 112, and the rear high-level ECU 113, and notifies it of the failure. The high-level ECU that received the notification functions as a substitute for the central ECU/core ECU 101.

The central ECU/core ECU 101 detects by using its failure diagnose function whether a failure has occurred in any of the front high-level ECU 111, the central high-level ECU 112, and the rear high-level ECU 113. In the case in which a failure has occurred in one of the front high-level ECU 111, the central high-level ECU 112, and the rear high-level ECU 113, the central ECU/core ECU 101 selects at least one high-level ECU that substitutes for the functions and makes the selected high-level ECU function as a substitute for the failed high-level ECU. For example, in a case in which a failure has occurred in the front high-level ECU 111, the central ECU/core ECU 101 makes the central high-level ECU 112 perform, as a substitute, the function of turning on and off the power supply to the travel system ECU 61.

The configuration illustrated in FIG. 6 is a mere example. Any configuration is possible in which the functions of one of the central ECU/core ECU 101, the front high-level ECU 111, the central high-level ECU 112, and the rear high-level ECU 113 can be substituted for by at least one of the other high-level ECUs.

3. Operation of Power-Supply Control Device

Figure 7:
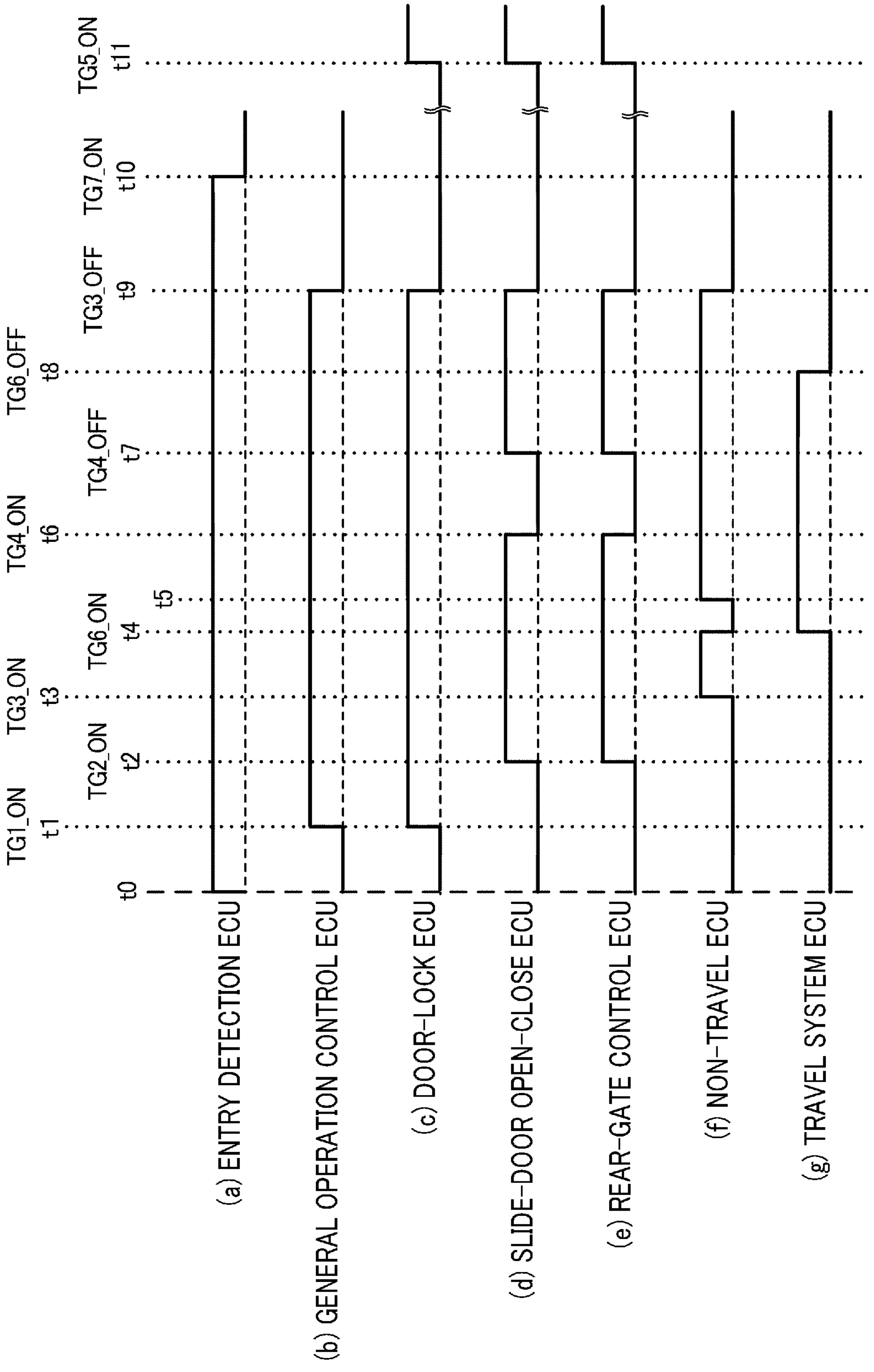
FIG. 7 is a timing chart illustrating the operation of the power-supply control system.

FIG. 7 is a timing chart illustrating the operation of the power-supply control device 100.

FIG. 7 shows the state of the power supply to the ECUs connected to the power-supply control device 100; to be more specific, it shows whether each power supply is on or off. Part (a) of FIG. 7 shows the state of power supply to the entry detection ECU 22, part (b) of FIG. 7 the general operation control ECU 62, part (c) of FIG. 7 the door-lock ECU 14, part (d) of FIG. 7 the slide-door open-close ECU 20, part (e) of FIG. 7 the rear-gate open-close ECU 21, part (f) of FIG. 7 the non-travel ECU 63, and part (g) of FIG. 7 the travel system ECU 61.

In FIG. 7, assume that at time t0, the vehicle is parked, the engine and other devices are stopped, and no person is in the vehicle. At time t0, power is supplied to the entry detection ECU 22. The power of the other devices is off.

The entry detection ECU 22 detects the FOB key or a touch operation of a person and outputs the trigger signal TG1 (time t1). In response to this operation, the power-supply control device 100, at time t1, turns on the power supply to the door-lock ECU 14 and outputs a control signal to the door-lock ECU 14 to instruct it to perform unlocking. With this operation, the door-lock device 35 unlocks the door-lock, making it possible to get in the vehicle.

At time t1, the power-supply control device 100 turns on the general operation control ECU 62. This enables communication by the TSU 36 and use of the lighting devices 40.

When the person who intends to get in the vehicle moves a door operation unit 51, the trigger signal TG2 is outputted (time t2). As described earlier, the door operation unit 51 is provided at each of the slide door and the rear gate. One or both of them are operated at time t2. In response to the output of the trigger signal TG2, the power-supply control device 100 starts to supply the power to both the rear-gate open-close ECU 21 and the entry detection ECU 22. At time t2, the power-supply control device 100 also outputs a control signal to open the door.

For example, in the case in which the door operation unit 51 provided at the slide door outputs the trigger signal TG2 (time t2), the power-supply control device 100 turns on the power supply to both the slide-door open-close ECU 20 and the rear-gate open-close ECU 21. In this case, the power-supply control device 100 outputs a control signal to the slide-door open-close ECU 20 to make it instruct the slide-door open-close device 41 to open the slide door.

When the occupant detection ECU 23 detects that there is a person in the vehicle, it outputs the trigger signal TG3 (time t3). In response to the trigger signal TG3, the power-supply control device 100 turns on the power supply to the non-travel ECU 63. This operation makes the audio equipment 37, the air conditioner 38, and like operable.

Then, when the ignition switch 52 is operated, the trigger signal TG6 is outputted (time t4). FIG. 7 shows an example in which in response to the operation of the ignition switch 52, an instruction to start the engine is given at time t4. In response to the output of the trigger signal TG6, the power-supply control device 100 turns on the power supply to the travel system ECU 61. With this operation, the self-starting motor 32 starts its operation at time t4, and the engine starts.

The power-supply control device 100 turns off the supply of electric power to the non-travel ECU 63 during the period from time t4 to time t5 which is a specified time after time t4. The period from t4 to t5 is a period during which the self-starting motor 32 is driven. The power-supply control device 100 stops the power supply to the non-travel ECU 63 to reduce the electric power consumed by the non-travel ECU 63 and the operating units connected to the non-travel ECU 63 during the operation of the self-starting motor 32. This operation can reduce the load to the power supply of the vehicle. Since this operation ensures the supply of the electric power required by the self-starting motor 32, it increases the complete-explosion success rate during the operation of the self-starting motor 32. This makes it possible to start the engine more smoothly. When the operation of the self-starting motor 32 is completed at time t5, the power-supply control device 100 resumes the power supply to the non-travel ECU 63.

When the vehicle starts to travel and the vehicle speed is not zero, the vehicle-speed detection ECU 24 outputs the trigger signal TG4 (time t6). In response to the output of the trigger signal TG4, the power-supply control device 100 turns off the power supply to the slide-door open-close ECU 20 and the rear-gate open-close ECU 21. This operation reduces the electric power consumed by the slide-door open-close ECU 20, the rear-gate open-close ECU 21, the slide-door open-close device 41, and the rear-gate open-close device 42. Since the doors are not opened or closed while the vehicle is traveling, the occupants do not feel any inconvenience.

When the vehicle stops traveling, the output of the trigger signal TG4 stops (time t7). In response to the stop of the output of the trigger signal TG4, the power-supply control device 100 resumes the power supply to the door-lock ECU 14, the slide-door open-close ECU 20, and the rear-gate open-close ECU 21.

In response to the operation of turning off the ignition switch 52, the ignition switch 52 stops outputting the trigger signal TG6 (time t8). In response to the stop of the output of the trigger signal TG6, the power-supply control device 100 stops the power supply to the travel system ECU 61.

When all the persons who had been in the vehicle get out, the occupant detection ECU 23 stops outputting the trigger signal TG3 (time t9). In response to the stop of the output of the trigger signal TG3, the power-supply control device 100 stops the power supply to the door-lock ECU 14, the slide-door open-close ECU 20, the rear-gate open-close ECU 21, and the general operation control ECU 62. The time when the power-supply control device 100 turns off the power supply to the door-lock ECU 14 may be delayed from time t9 by a specified time.

After the vehicle stops, when the electrical-current cut-operation lever 53 is operated, and the electrical-current cut-operation lever 53, in response to this operation, outputs the trigger signal TG10 (time t10), the power-supply control device 100 stops the power supply to the entry detection ECU 22. This operation stops the entry detection ECU 22, and the wireless reception unit 43 and the touch sensors 44 connected to the entry detection ECU 22. This makes it possible to reduce the dark current while the vehicle is not used.

The power-supply control device 100 may stop the power supply at time t10 to at least some of the central ECU/core ECU 101, the front high-level ECU 111, the central high-level ECU 112, and the rear high-level ECU 113. In this case, the dark current can be reduced more.

Meanwhile, in the case in which the impact detection ECU 25 detects an impact while the vehicle is traveling, the impact detection ECU 25 outputs the trigger signal TG5 (time t11). At time t11, the power-supply control device 100 starts to supply electric power to the door-lock ECU 14, the slide-door open-close ECU 20, and the rear-gate open-close ECU 21. This operation enables the occupants to get out of the vehicle. The power-supply control device 100 may output control signals to the slide-door open-close ECU 20 and the rear-gate open-close ECU 21 at time t11 to make them execute control to open the slide door and the rear gate.

4. Other Embodiment

The above embodiment is to show a specific example to which the present invention is applied, and thus it does not intend to limit configurations to which the invention is applied.

The vehicle to which the vehicle control system 1 is applied may be a passenger vehicle or a freight vehicle, and it is not limited to four-wheeled vehicles. For example, the invention can be applied to a vehicle not having a slide door. The vehicle is not limited to a vehicle driven by an internal combustion engine but may be an electric vehicle including a battery and a motor. In this case, the travel operating unit includes the motor, and the travel control unit includes an ECU that controls the motor. The vehicle control system 1 can also be applied to a hybrid vehicle including an internal combustion engine and a motor.

Although the above embodiment describes the slide-door open-close device 41 as a first open-close unit and describes the rear-gate open-close device 42 as a second open-close unit, these are mere example. The first open-close unit and the second open-close unit may be a power window device that opens and closes a window, a device that opens and closes a sunroof, or the like.

Connection between each ECU and the front high-level ECU 111, the central high-level ECU 112, and the rear high-level ECU 113 included in the power-supply control device 100 may be changed as appropriate. Although the above embodiment describes an example in which the central high-level ECU 112 operates as the lock high-level control unit, the non-travel high-level control unit, and the travel high-level control unit, and the rear high-level ECU 113 operates as the open-close high-level control unit, the correspondence relationship between these functions may be changed according to the configuration of the connections with the ECUs.

5. Configurations Supported by Above Embodiment

The above embodiment is a specific example of the following configurations.

(First Item) A power-supply control system including: a lock control unit that controls a door-lock device configured to lock a door of a vehicle for getting in and out; a lock high-level control unit that turns on and off supply of electric power from a power supply of the vehicle to the lock control unit and makes the lock control unit control unlocking and locking of the door-lock device; a first open-close control unit that is connected to a first open-close unit configured to drive an open-close unit including one of the door for getting in and out, a door of a luggage compartment of the vehicle, and a window of the vehicle, and that controls the first open-close unit; a second open-close control unit that is connected to a second open-close unit configured to drive an open-close unit including one of the door for getting in and out, the door of the luggage compartment of the vehicle, and the window of the vehicle and that controls the second open-close unit; an open-close high-level control unit that is connected to an operation unit configured to detect operation by using a switch, and that based on the operation of the operation unit, executes at least one operation out of an operation of turning on and off supply of power from the power supply to the first open-close control unit, an operation of turning on and off supply of power from the power supply to the second open-close control unit, an operation of making the first open-close control unit execute control of open-close operation of the first open-close unit, and an operation of making the second open-close control unit execute control of open-close operation of the second open-close unit; and a travel control unit that controls a travel operating unit related to either driving the power of the vehicle, braking the vehicle, or steering the vehicle, in which the lock high-level control unit is connected to an operation detection unit that detects operation from the outside of the vehicle and outputs a first trigger signal, and the lock high-level control unit, in a state in which supply of electric power from the power supply to the lock control unit, the travel operating unit, and the travel control unit is stopped, while the first trigger signal is not outputted, makes electric power not be supplied from the power supply to the lock control unit, the travel operating unit, and the travel control unit, and when the first trigger signal is outputted, starts to supply electric power from the power supply to the lock control unit and the door-lock device and makes the lock control unit execute control to unlock the door-lock device.

In the power-supply control system of the first item, until the first trigger signal is outputted in response to the operation from the outside of the vehicle, electric power is not supplied to the lock control unit, the travel operating unit, and the travel control unit, and when the first trigger signal is outputted, electric power supply starts. This can reduce the electric power consumed when operation is not necessary, making electric power supply efficient.

(Second Item) The power-supply control system according to the first item, in which when the switch detects operation, the open-close high-level control unit obtains a second trigger signal that the operation unit outputs, and the open-close high-level control unit, in a state in which supply of electric power from the power supply to the first open-close control unit, the second open-close control unit, the travel operating unit, and the travel control unit is stopped, while the second trigger signal is not outputted, makes electric power not be supplied from the power supply to the first open-close control unit, the second open-close control unit, the travel operating unit, and the travel control unit, and when the second trigger signal is outputted, starts to supply electric power from the power supply to the first open-close control unit, the second open-close control unit, and the open-close unit.

In the power-supply control system of the second item, until the second trigger signal is outputted in response to operation of the switch, electric power is not supplied to the first open-close control unit, the second open-close control unit, the travel operating unit, and the travel control unit. This can reduce the electric power consumed when the first open-close unit, the second open-close unit, and the travel operating unit do not need to operate, making electric power supply efficient.

(Third Item) The power-supply control system according to the second item, further including: a plurality of the travel control units that are control units different from the lock control unit, the first open-close control unit, and the second open-close control unit and control the travel operating unit; a plurality of non-travel control units that are control units different from the lock control unit, the first open-close control unit, and the second open-close control unit and controls a non-travel operating unit that is an operating unit different from driving the power of the vehicle, braking the vehicle, and steering the vehicle; an occupant detection unit that detects an occupant inside the vehicle and outputs a third trigger signal; and a non-travel high-level control unit that turns on and off supply of electric power from the power supply of the vehicle to the non-travel control units, in which the non-travel high-level control unit, in a state in which supply of electric power from the power supply to the travel operating unit, the travel control units, and the non-travel control units is stopped, while the third trigger signal is not outputted, makes electric power not be supplied from the power supply to the travel operating unit, the travel control units, and the non-travel control units, and when the third trigger signal is outputted, starts to supply electric power from the power supply to the travel operating unit, the travel control units, and the non-travel control units.

In the power-supply control system of the third item, until an occupant of the vehicle is detected, and the third trigger signal is outputted, electric power is not supplied to the travel operating unit, the travel control units, and the non-travel control units. This can reduce the electric power consumed when the travel operating unit and the non-travel operating unit do not need to operate, making electric power supply efficient.

(Fourth Item) The power-supply control system according to the third item, in which the lock high-level control unit is disposed between the operation detection unit and the lock control unit, the open-close high-level control unit is disposed between the operation unit and the first and second open-close control units, the power-supply control system further includes a central control unit positioned between the operation detection unit and the lock high-level control unit and also positioned between the operation unit and the open-close high-level control unit, and the central control unit, in a state in which supply of electric power to the lock control unit, the first open-close control unit, the second open-close control unit, the travel operating unit, and the travel control units is stopped, while the first trigger signal and the second trigger signal are not outputted, makes electric power not be supplied from the power supply to the lock control unit, the first open-close control unit, the second open-close control unit, the travel operating unit, and the travel control units, and when the first trigger signal and the second trigger signal are outputted, starts to supply electric power from the power supply to the lock control unit, the first open-close control unit, the second open-close control unit, the travel operating unit, and the travel control units.

In the power-supply control system of the fourth item, the central control unit controls the supply of electric power to the lock control unit, the first open-close control unit, the second open-close control unit, the travel operating unit, and the travel control units. This can reduce the electric power consumed when the first open-close unit, the second open-close unit, and the travel operating unit do not need to operate, making electric power supply efficient.

(Fifth Item) The power-supply control system according to the fourth item, further including a travel high-level control unit that turns on and off supply of electric power from the power supply of the vehicle to the travel control units, in which the central control unit has functions of at least two substitute-target control units, for which the central control unit substitutes, selected from the lock high-level control unit, the open-close high-level control unit, the non-travel high-level control unit, and the travel high-level control unit, and instead of the substitute-target control units, turns on and off supply of electric power from the power supply based on the first trigger signal, the second trigger signal, and the third trigger signal.

In the power-supply control system of the fifth item, electric power control based on the first trigger signal, the second trigger signal, and the third trigger signal are made redundant. Thus, even in the case in which a failure or the like occurs in a high-level control unit, electric power can be supplied in the vehicle as necessary.

(Sixth Item) The power-supply control system according to the fourth item, further including a travel detection unit that outputs a fourth trigger signal that indicates a traveling state of the vehicle, in which the central control unit, in a case in which it is determined based on the fourth trigger signal that the vehicle is traveling, makes electric power not be supplied from the power supply to at least one of the first open-close control unit, the second open-close control unit, the first open-close unit, and the second open-close unit.

In the power-supply control system of the sixth item, the supply of electric power to the first open-close unit and the second open-close unit is stopped while the vehicle is traveling. This can reduce the electric power consumed when open-close operations of the first open-close unit and the second open-close unit are not necessary, making electric power supply efficient.

(Seventh Item) The power-supply control system according to the fourth item, further including an impact detection unit that detects an impact exerted on the vehicle, in which the central control unit, when the impact detection unit detects an impact, makes electric power be supplied from the power supply to at least one of the first open-close control unit, the second open-close control unit, the first open-close unit, and the second open-close unit.

In the power-supply control system of the seventh item, when an impact to the vehicle is detected, it is possible to get out of the vehicle and thus possible to ensure the convenience of the occupant while reducing electric power consumption.

(Eighth Item) The power-supply control system according to the fourth item, in which in response to operation of a second operation unit that detects operation by using a second switch, the central control unit makes power not be supplied from the power supply to the operation detection unit, and power is made not to be supplied from the power supply to at least one of the central control unit, the lock high-level control unit, the open-close high-level control unit, and the non-travel high-level control unit.

In the power-supply control system of the eighth item, it is possible to further reduce the dark current consumed when the drive functions and control functions of the vehicle are not necessary, such as when the vehicle is transported.

(Ninth Item) The power-supply control system according to the fourth item, further including one ECU that executes functions of the lock high-level control unit and the open-close high-level control unit.

In the power-supply control system of the ninth item, it is possible to control the supply of electric power with a small number of control units and thus possible to make electric power supply in the vehicle efficient.

(Tenth Item) The power-supply control system according to the fourth item, in which the central control unit, while a self-starting motor provided for an internal combustion engine included in the vehicle is operating, stops supplying electric power from the power supply to at least one of the non-travel control units and the non-travel operating unit, and supplies electric power from the power supply to the travel control units and the travel operating unit.

The power-supply control system of the tenth item reduces the electric power consumed by the non-travel control units and the non-travel operating units while the self-starting motor is operated. This can reduce the load to the power supply at the time when the engine starts. In addition, this increases the success rate of the engine starting, making it possible to start the engine more smoothly.

(Eleventh Item) A power-supply control method in a power-supply control system including: a lock control unit that controls a door-lock device configured to lock a door of a vehicle for getting in and out; a lock high-level control unit that turns on and off supply of electric power from a power supply of the vehicle to the lock control unit and makes the lock control unit control unlocking and locking of the door-lock device; a first open-close control unit that is connected to a first open-close unit configured to drive an open-close unit including one of the door for getting in and out, a door of a luggage compartment of the vehicle, and a window of the vehicle, and that controls the first open-close unit; a second open-close control unit that is connected to a second open-close unit configured to drive an open-close unit including one of the door for getting in and out, the door of the luggage compartment of the vehicle, and the window of the vehicle and that controls the second open-close unit; an open-close high-level control unit that is connected to an operation unit configured to detect operation by using a switch, and that based the operation of the operation unit, executes at least one operation out of an operation of turning on and off supply of power from the power supply to the first open-close control unit, an operation of turning on and off supply of power from the power supply to the second open-close control unit, an operation of making the first open-close control unit execute control of open-close operation of the first open-close unit, and an operation of making the second open-close control unit execute control of open-close operation of the second open-close unit; and a travel control unit that controls a travel operating unit related to either driving the power of the vehicle, braking the vehicle, or steering the vehicle, the power-supply control method including: obtaining, by an operation detection unit, a first trigger signal outputted in response to operation from the outside of the vehicle; and in a state in which supply of electric power from the power supply to the lock control unit, the travel operating unit, and the travel control unit is stopped, while the first trigger signal is not outputted, making electric power not be supplied from the power supply to the lock control unit, the travel operating unit, and the travel control unit, and when the first trigger signal is outputted, starting supply electric power from the power supply to the lock control unit and the door-lock device and making the lock control unit execute control to unlock the door-lock device.

In the power-supply control method of the eleventh item, until the first trigger signal is outputted in response to operation from the outside of the vehicle, electric power is not supplied to the lock control unit, the travel operating unit, and the travel control unit, and when the first trigger signal is outputted, electric power supply starts. This can reduce the electric power consumed when operation is not necessary, making electric power supply efficient.

REFERENCE SIGNS LIST

1 vehicle control system (power-supply control system)
11 engine ECU (travel control unit)
12 brake ECU (travel control unit)
13 power steering ECU (travel control unit)
14 door-lock ECU (lock control unit)
15 communication ECU
16 audio control ECU (non-travel control unit)
17 air conditioner ECU (non-travel control unit)
18 meter ECU (non-travel control unit)
19 lighting control ECU
20 slide-door open-close ECU (first open-close control unit)
21 rear-gate open-close ECU (second open-close control unit)
22 entry detection ECU (operation detection unit)
23 occupant detection ECU (occupant detection unit)
24 vehicle-speed detection ECU (vehicle-speed detection unit)
25 impact detection ECU (impact detection unit)
31 fuel supply device (travel operating unit)
32 self-starting motor (travel operating unit)
33 brake device (travel operating unit)
34 power steering device (travel operating unit)
35 door-lock device
36 TSU
37 audio equipment
38 air conditioner
39 meter panel
40 lighting device
41 slide-door open-close device (first open-close unit)
42 rear-gate open-close device (second open-close unit)
43 wireless reception unit
44 touch sensor
45 camera

46 seating sensor
46 seat-belt sensor
48 vehicle-speed sensor
49 G sensor
51 door operation unit (operation unit)
52 ignition switch
53 electrical-current cut-operation lever (second operation unit)
61 travel system ECU (travel control unit)
62 general operation control ECU
63 non-travel ECU (non-travel control unit)
71 travel system device (travel operating unit)
72 general operating unit
73 non-travel device (non-travel operating unit)
100 power-supply control device
101 central ECU/core ECU (central control unit)
111 front high-level ECU
112 central high-level ECU (lock high-level control unit, non-travel high-level control unit, travel high-level control unit)
113 rear high-level ECU (open-close high-level control unit)

What is claimed is:

1. A power-supply control system comprising:

a lock processor that controls a door-lock configured to lock a door of a vehicle for getting in and out;

a lock high-level processor that turns on and off supply of electric power from a power supply of the vehicle to the lock processor and makes the lock processor control unlocking and locking of the door-lock;

a first open-close processor that is connected to a first open-close device which is a first actuator configured to drive an open-close unit including one of the door for getting in and out, a door of a luggage compartment of the vehicle, and a window of the vehicle, and that controls the first open-close device;

a second open-close processor that is connected to a second open-close device which is a second actuator configured to drive an open-close unit including one of the door for getting in and out, the door of the luggage compartment of the vehicle, and the window of the vehicle and that controls the second open-close device;

an open-close high-level processor that is connected to an operation unit which is a lever or a handle configured to detect operation by using a switch, and that based on the operation of the operation unit, executes at least one operation out of an operation of turning on and off supply of power from the power supply to the first open-close processor, an operation of turning on and off supply of power from the power supply to the second open-close processor, an operation of making the first open-close processor execute control of open-close operation of the first open-close device, and an operation of making the second open-close processor execute control of open-close operation of the second open-close device; and a travel processor that controls a travel operating unit which is either a motor driving the power of the vehicle, a brake braking the vehicle, or a power steering steering the vehicle, wherein the lock high-level processor is connected to an operation detection processor that detects operation of a FOB (Frequency Operated Button) key from outside of the vehicle or operation of a touch sensor provided to a door handle and outputs a first trigger signal, and the lock high-level processor, in a state in which supply of electric power from the power supply to the lock processor, the travel operating unit, and the travel processor is stopped, while the first trigger signal is not outputted, makes electric power not be supplied from the power supply to the lock processor, the travel operating unit, and the travel processor, and when the first trigger signal is outputted, starts to supply electric power from the power supply to the lock processor and the door-lock and makes the lock processor execute control to unlock the door-lock, when the switch detects operation, the open-close high-level processor obtains a second trigger signal that the operation unit outputs, and the open-close high-level processor, in a state in which supply of electric power from the power supply to the first open-close processor, the second open-close processor, the travel operating unit, and the travel processor is stopped, while the second trigger signal is not outputted, makes electric power not be supplied from the power supply to the first open-close processor, the second open-close processor, the travel operating unit, and the travel processor, when the second trigger signal is outputted, starts to supply electric power from the power supply to the first open-close processor, the second open-close processor, the first open-close device, and the second open-close device, the power-supply control system further comprising:

a plurality of the travel processors that are processors different from the lock processor, the first open-close processor, and the second open-close processor and control the travel operating unit;

a plurality of non-travel processors that are processors different from the lock processor, the first open-close processor, and the second open-close processor and controls a non-travel operating unit that is an operating unit different from driving the power of the vehicle, braking the vehicle, and steering the vehicle;

an occupant detection processor that detects an occupant inside the vehicle and outputs a third trigger signal; and a non-travel high-level processor that turns on and off supply of electric power from the power supply of the vehicle to the non-travel processors, wherein the non-travel operating unit is audio equipment, an air conditioner, or a meter panel, the non-travel high-level processor, in a state in which supply of electric power from the power supply to the travel operating unit, the travel processors, and the non-travel processors is stopped, while the third trigger signal is not outputted, makes electric power not be supplied from the power supply to the travel operating unit, the travel processors, and the non-travel processors, and when the third trigger signal is outputted, starts to supply electric power from the power supply to the travel operating unit, the travel processors, and the non-travel processors.

2. The power-supply control system according to claim 1, wherein the lock high-level processor is disposed between the operation detection processor and the lock processor, the open-close high-level processor is disposed between the operation unit and the first and second open-close processors, the power-supply control system further comprises a central processor positioned between the operation detection processor and the lock high-level processor and also positioned between the operation unit and the open-close high-level processor, and the central processor, in a state in which supply of electric power to the lock processor, the first open-close processor, the second open-close processor, the travel operating unit, and the travel processors is stopped, while the first trigger signal and the second trigger signal are not outputted, makes electric power not be supplied from the power supply to the lock processor, the first open-close processor, the second open-close processor, the travel operating unit, and the travel processors, and when the first trigger signal and the second trigger signal are outputted, starts to supply electric power from the power supply to the lock processor, the first open-close processor, the second open-close processor, the travel operating unit, and the travel processors.

3. The power-supply control system according to claim 2, further comprising a travel high-level processor that turns on and off supply of electric power from the power supply of the vehicle to the travel processors, wherein the central processor has functions of at least two substitute-target processors, for which the central processor substitutes, selected from the lock high-level processor, the open-close high-level processor, the non-travel high-level processor, and the travel high-level processor, and instead of the substitute-target processors, turns on and off supply of electric power from the power supply based on the first trigger signal, the second trigger signal, and the third trigger signal.

4. The power-supply control system according to claim 2, further comprising a travel detection processor that outputs a fourth trigger signal that indicates a traveling state of the vehicle, wherein the central processor, in a case in which it is determined based on the fourth trigger signal that the vehicle is traveling, makes electric power not be supplied from the power supply to at least one of the first open-close processor, the second open-close processor, the first open-close device, and the second open-close device.

5. The power-supply control system according to claim 2, further comprising an impact detection processor that detects an impact exerted on the vehicle, wherein the central processor, when the impact detection processor detects an impact, makes electric power be supplied from the power supply to at least one of the first open-close processor, the second open-close processor, the first open-close device, and the second open-close device.

6. The power-supply control system according to claim 2, wherein in response to operation of an electrical-current cut-operation lever that detects operation by using a second switch, the central processor makes power not be supplied from the power supply to the operation detection processor, and power is made not to be supplied from the power supply to at least one of the central processor, the lock high-level processor, the open-close high-level processor, and the non-travel high-level processor.

7. The power-supply control system according to claim 2, further comprising one ECU that executes functions of the lock high-level processor and the open-close high-level processor.

8. The power-supply control system according to claim 2, wherein the central processor, while a self-starting motor provided for an internal combustion engine included in the vehicle is operating, stops supplying electric power from the power supply to at least one of the non-travel processors and the non-travel operating unit, and supplies electric power from the power supply to the travel processors and the travel operating unit.

9. A power-supply control method in a power-supply control system including:

a lock processor that controls a door-lock configured to lock a door of a vehicle for getting in and out;

a lock high-level processor that turns on and off supply of electric power from a power supply of the vehicle to the lock processor and makes the lock processor control unlocking and locking of the door-lock;

a first open-close processor that is connected to a first open-close device which is a first actuator configured to drive an open-close unit including one of the door for getting in and out, a door of a luggage compartment of the vehicle, and a window of the vehicle, and that controls the first open-close device;

a second open-close processor that is connected to a second open-close device which is a second actuator configured to drive an open-close unit including one of the door for getting in and out, the door of the luggage compartment of the vehicle, and the window of the vehicle and that controls the second open-close device;

an open-close high-level processor that is connected to an operation unit which is a lever or a handle configured to detect operation by using a switch, and that based on the operation of the operation unit, executes at least one operation out of an operation of turning on and off supply of power from the power supply to the first open-close processor, an operation of turning on and off supply of power from the power supply to the second open-close processor, an operation of making the first open-close processor execute control of open-close operation of the first open-close device, and an operation of making the second open-close processor execute control of open-close operation of the second open-close device;

a travel processor that controls a travel operating unit which is either a motor driving the power of the vehicle, a brake braking the vehicle, or a power steering steering the vehicle;

a plurality of the travel processors that are processors different from the lock processor, the first open-close processor, and the second open-close processor and control the travel operating unit;

a plurality of non-travel processors that are processors different from the lock processor, the first open-close processor, and the second open-close processor and controls a non-travel operating unit that is an operating unit different from driving the power of the vehicle, braking the vehicle, and steering the vehicle, the non-travel operating unit being audio equipment, an air conditioner, or a meter panel;

an occupant detection processor that detects an occupant inside the vehicle and outputs a third trigger signal; and a non-travel high-level processor that turns on and off supply of electric power from the power supply of the vehicle to the non-travel processors, the power-supply control method comprising:

obtaining, by an operation detection processor, a first trigger signal outputted in response to operation of a FOB (Frequency Operated Button) key from outside of the vehicle or operation of a touch sensor provided to a door handle; and in a state in which supply of electric power from the power supply to the lock processor, the travel operating unit, and the travel processor is stopped, while the first trigger signal is not outputted, making electric power not be supplied from the power supply to the lock processor, the travel operating unit, and the travel processor, and when the first trigger signal is outputted, starting supply of electric power from the power supply to the lock processor and the door-lock and making the lock processor execute control to unlock the door-lock, when the switch detects operation, obtaining a second trigger signal that the operation unit outputs, and in a state in which supply of electric power from the power supply to the first open-close processor, the second open-close processor, the travel operating unit, and the travel processor is stopped, while the second trigger signal is not outputted, making electric power not be supplied from the power supply to the first open-close processor, the second open-close processor, the travel operating unit, and the travel processor, when the second trigger signal is outputted, starting to supply electric power from the power supply to the first open-close processor, the second open-close processor, the first open-close device, and the second open-close device, in a state in which supply of electric power from the power supply to the travel operating unit, the travel processors, and the non-travel processors is stopped, while the third trigger signal is not outputted, making electric power not be supplied from the power supply to the travel operating unit, the travel processors, and the non-travel processors, and when the third trigger signal is outputted, starting to supply electric power from the power supply to the travel operating unit, the travel processors, and the non-travel processors.

* * * * *